United States Patent [19]

Yamashita et al.

[11] Patent Number: 4,898,774
[45] Date of Patent: Feb. 6, 1990

[54] CORROSION AND WEAR RESISTANT MAGNETIC DISK

[75] Inventors: Tsutomu T. Yamashita; Ching-Cheng Shir, both of San Jose; Tu Chen, Saratoga; Ga-Lane Chen, Fremont, all of Calif.

[73] Assignee: Komag, Inc., Milpitas, Calif.

[21] Appl. No.: 943,333

[22] Filed: Dec. 17, 1986

Related U.S. Application Data

[63] Continuation-in-part of Ser. No. 847,990, Apr. 3, 1986.

[51] Int. Cl.$^4$ ............................................. G11B 5/64
[52] U.S. Cl. .................................. 428/336; 204/192.2; 427/131; 428/469; 428/694; 428/900
[58] Field of Search .............. 428/469, 694, 695, 900, 428/336; 427/131; 204/192.2

[56] References Cited

U.S. PATENT DOCUMENTS

| | | | |
|---|---|---|---|
| 3,912,461 | 10/1975 | Wakefield | 29/195 |
| 4,124,736 | 11/1978 | Patel et al. | 427/130 |
| 4,152,487 | 5/1979 | Yanagisawa | 428/900 |
| 4,277,540 | 7/1981 | Aine | 428/627 |
| 4,390,562 | 6/1983 | Yanagisawa | 427/130 |
| 4,411,963 | 10/1983 | Aine | 427/132 |
| 4,503,125 | 3/1985 | Nelson et al. | 428/900 |
| 4,579,777 | 4/1986 | Honguu et al. | 428/472 |
| 4,649,448 | 3/1987 | Nakayima | 360/127 |
| 4,820,666 | 4/1989 | Hirano et al. | 501/104 |

FOREIGN PATENT DOCUMENTS

| | | |
|---|---|---|
| 2039201 | 2/1971 | Fed. Rep. of Germany ...... 427/131 |
| 56-019517 | 2/1981 | Japan . |
| 57-176537 | 10/1982 | Japan . |
| 58-019739 | 2/1983 | Japan . |
| 60-0555083 | 3/1985 | Japan . |
| 60-093618 | 5/1985 | Japan . |
| 60-258727 | 12/1985 | Japan . |
| 61-074103 | 4/1986 | Japan . |
| 61-115230 | 6/1986 | Japan . |
| 61-131224 | 6/1986 | Japan . |
| 61-156523 | 7/1986 | Japan . |
| 62-175949 | 8/1987 | Japan . |

OTHER PUBLICATIONS

Thin Solid Films, 94 (1982), pp. 31–45.
Rao et al., "Scanning Transmission Electron Microscope Analysis of Solute Partitioning in a Partially Stabilized Zirconia", Journal of American Ceramic Society, Mar. 1982.
Rao et al., "Weak-Beam Analysis of Accommodation Substructure in Alumina of a Partially Stabilized Zirconia", General Motors Review, Apr. 1980.
Claussent et al., "Phase Transformation of Solid Solutions of $ZrO_2$ and $H_2O_2$ in an $Al_2O_3$ Matrix", Advances in Ceramics, vol. III, published by American Ceramics Society, Inc., 1981.
Claussen et al., "Design of Transformation-Toughened Ceramics", Advances in Ceramics, vol. III.
Morrison, "An Analysis of High-Coercivity Thin Film Fabrication Techniques and Their Associated Properties", Electrochemical Technology, vol. 6, No. 11–12, pp. 419–427.

Primary Examiner—Paul J. Thibodeau
Attorney, Agent, or Firm—Skjerven, Morrill, MacPherson, Franklin & Friel

[57] ABSTRACT

A film of magnetic recording media is covered with a layer comprising $ZrO_2$. Advantageously, the $ZrO_2$ layer inhibits corrosion in the underlying magnetic recording media. The $ZrO_2$ layer is wear resistant and also exhibits reduced static friction. In one embodiment of our invention, an intermediate layer is sputtered onto the media and the $ZrO_2$ is sputtered onto the intermediate layer. Advantageously, the intermediate layer adheres strongly to both the media and the $ZrO_2$. We have discovered that by providing the intermediate layer, static and dynamic friction between a read-write head and the disk tends to remain consistently low, and reliability of the disk is enhanced.

27 Claims, 5 Drawing Sheets

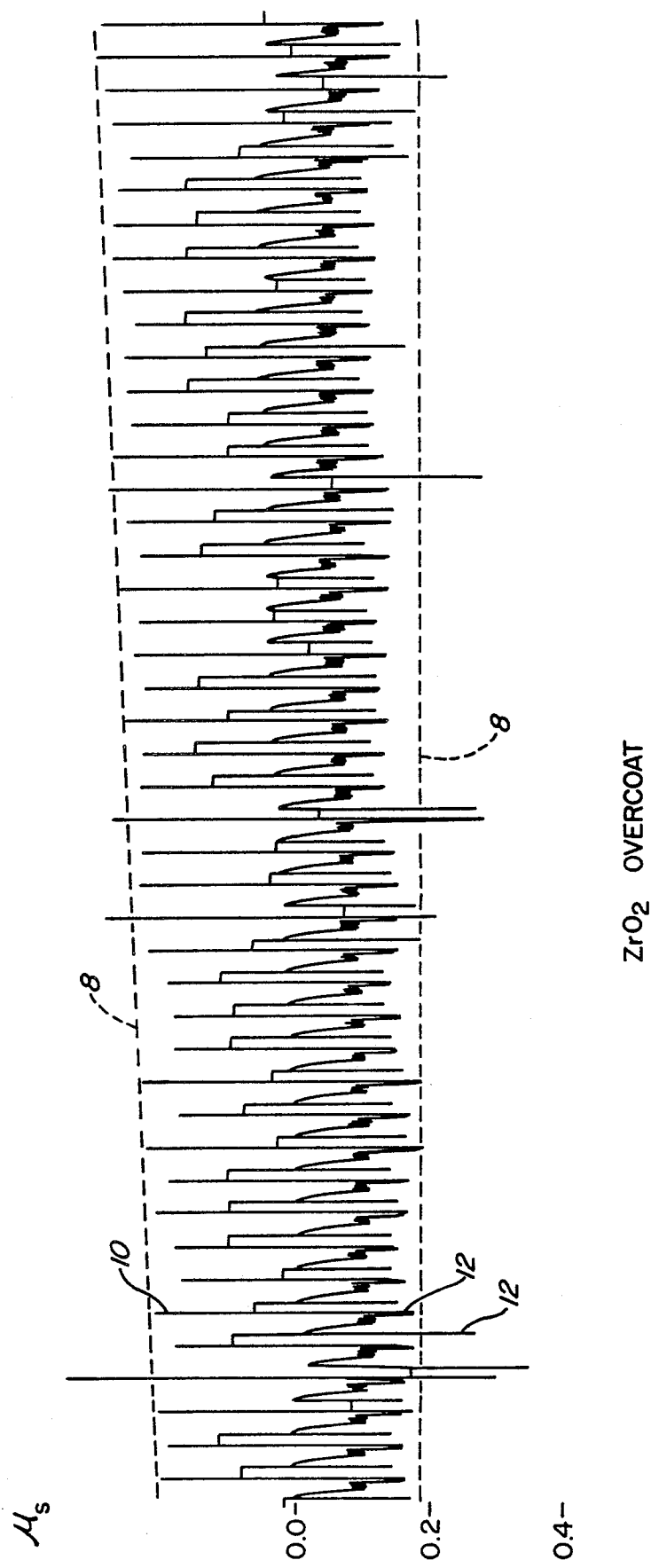
FIG._1.

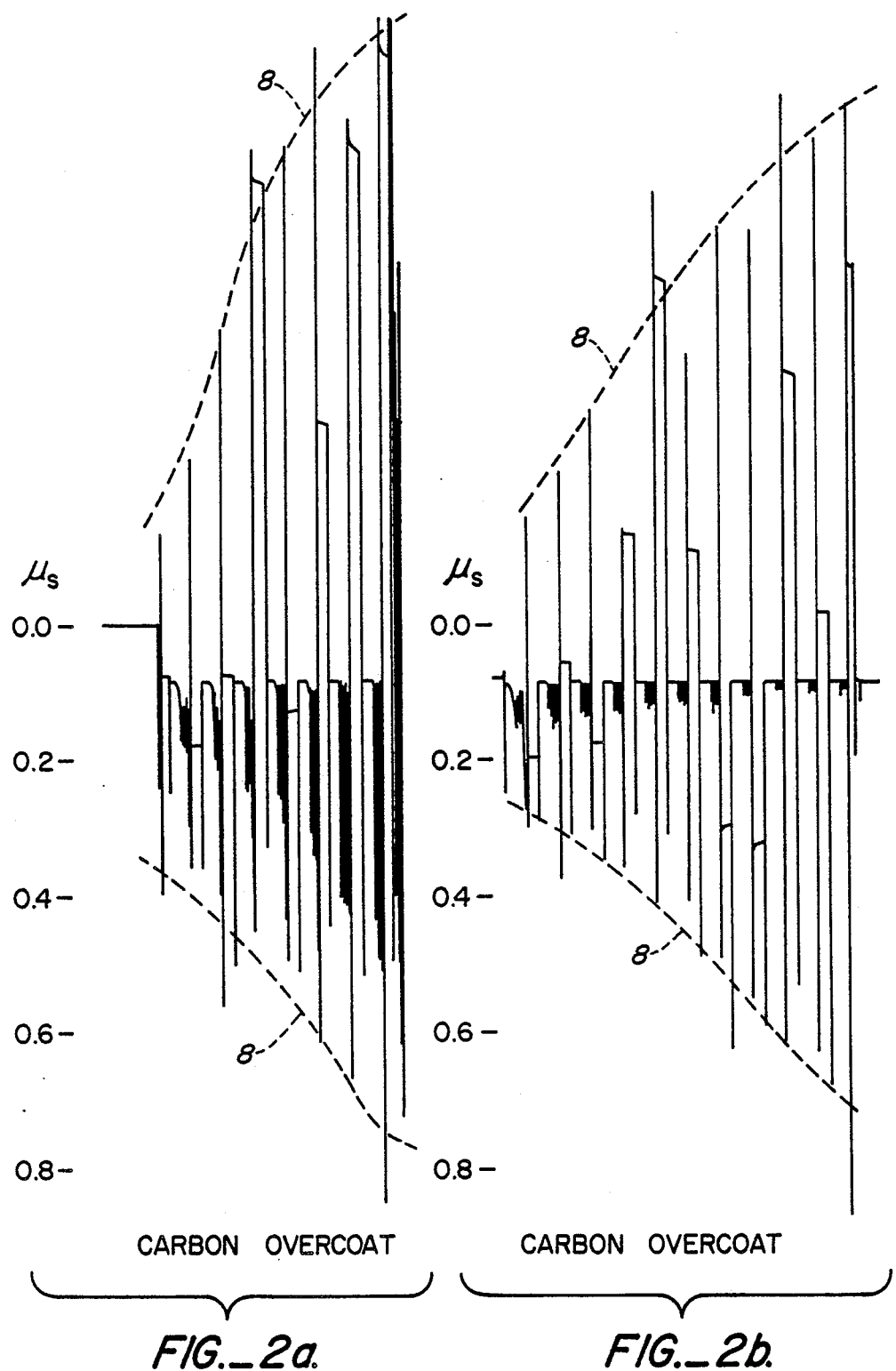

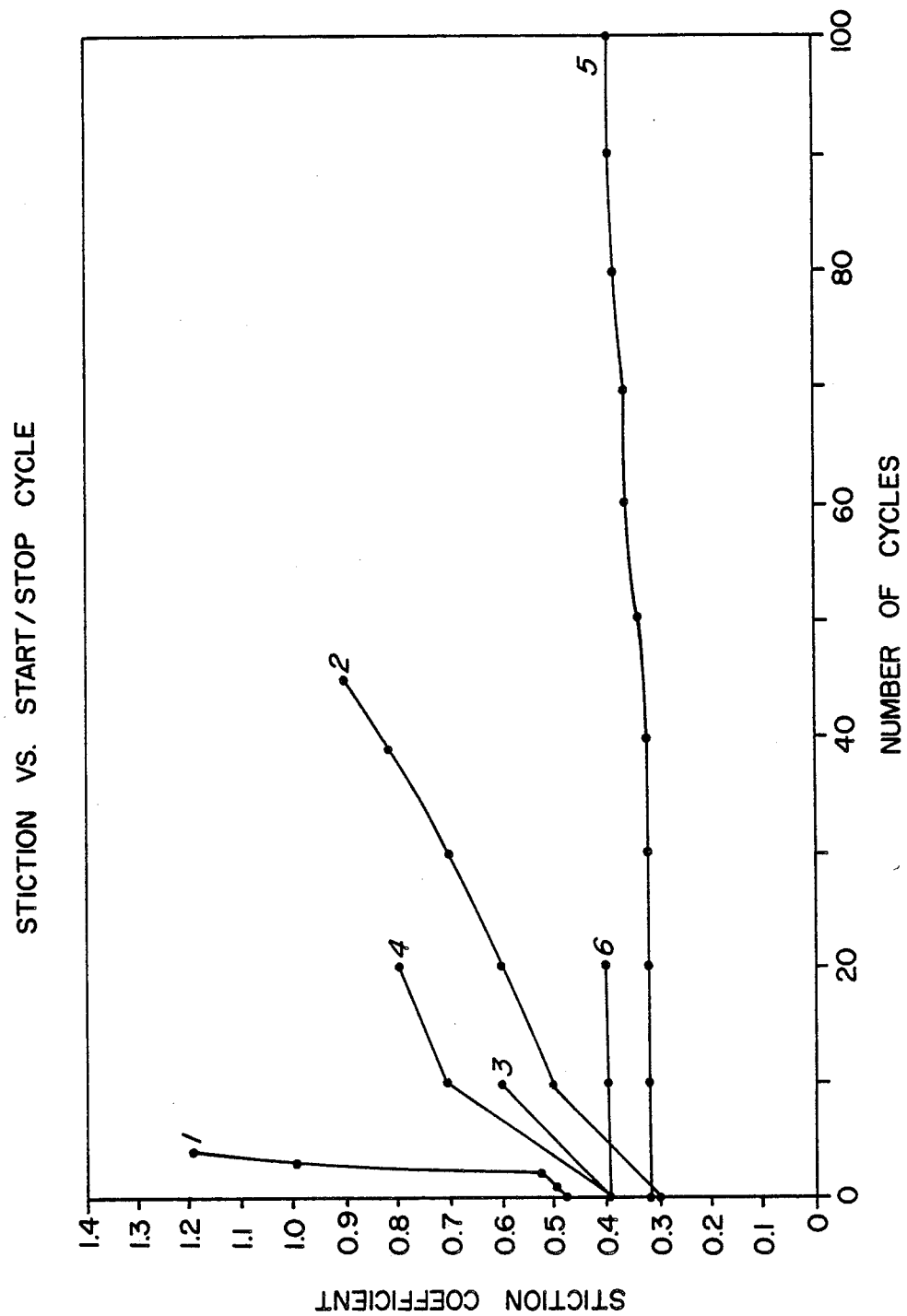
FIG._3.

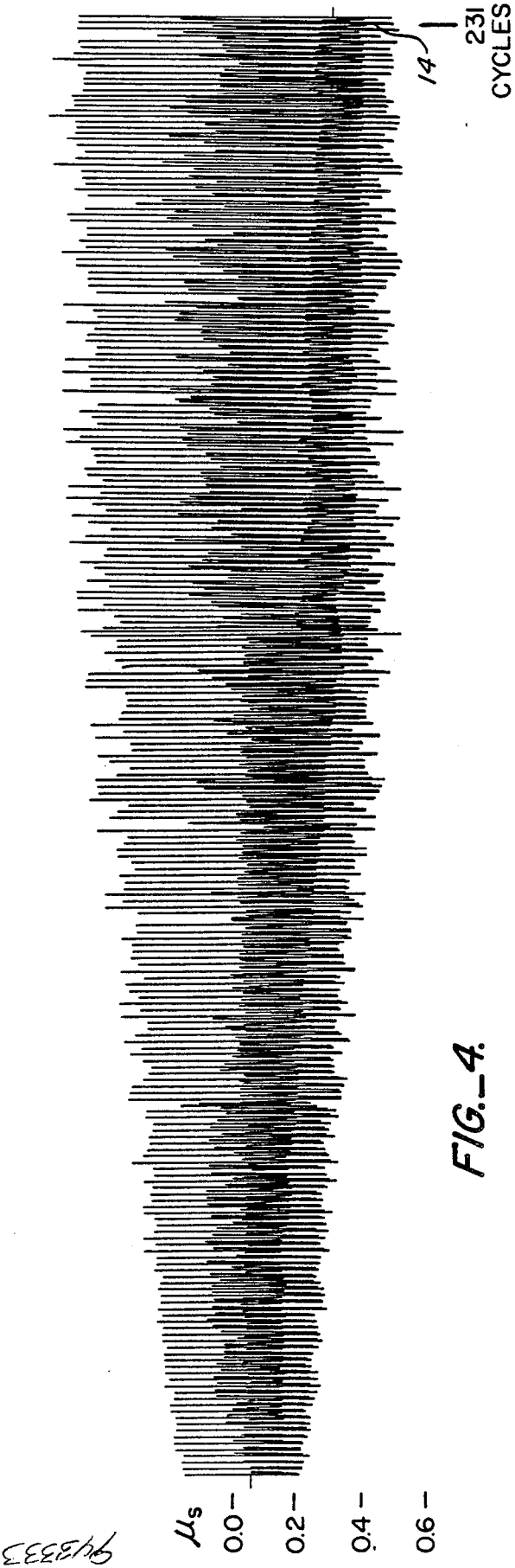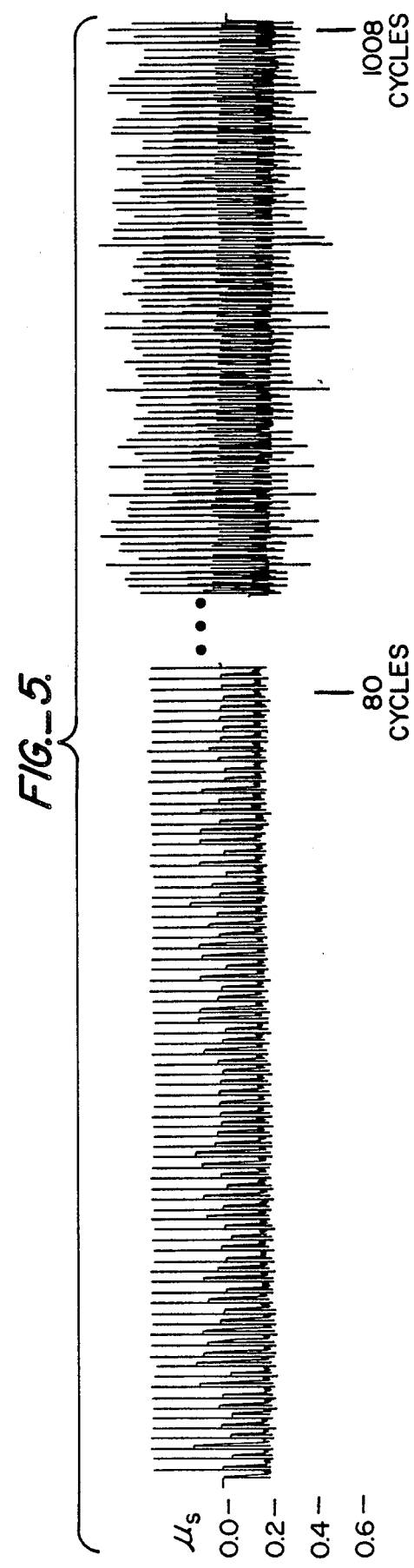

CORROSION AND WEAR RESISTANT MAGNETIC DISK

This application is a continuation in part of U.S. patent application Ser. No. 06/847,990, filed Apr. 3, 1986, entirely incorporated herein by reference.

BACKGROUND OF THE INVENTION

This invention relates to thin film magnetic recording media and more specifically to magnetic media covered with material which prevents corrosion, improves wear resistance, and reduces the head to media dynamic and static friction coefficients.

Metallic magnetic thin film disks used in memory applications typically comprise a substrate material which is coated with a magnetic alloy film which serves as the recording medium. Typically, the recording medium used in such disks is a cobalt-based alloy such as Co-Ni, Co-Cr, Co-Ni-Cr, Co-Pt or Co-Ni-Pt which is deposited by vacuum sputtering as discussed by J. K. Howard in "Thin Films For Magnetic Recording Technology: A Review", published in *Journal of Vacuum Science & Technology*, in January, 1986, incorporated herein by reference. Other prior art recording media comprises a Co-P or Co-Ni-P film deposited by chemical plating as discussed by Tu Chen et al. in "Microstructure and Magnetic Properties of Electroless Co-P Thin Films Grown on an Aluminum Base Disk Substrate", published in the *Journal of Applied Physics* in March, 1978, and Y. Suganuma et al. in "Production Process and High Density Recording Characteristics of Plated Disks", published in IEEE *Transactions on Magnetics* in November, 1982, also incorporated herein by reference. Several problems are encountered in using unprotected metallic thin film recording media. For example, unprotected metallic thin films tend to corrode, particularly under high humidity conditions. Further, such films have very little resistance to wear caused by frequent contact with the recording head.

To prevent these problems, it is known in the art of recording technology that overcoating thin film magnetic recording media with a hard protective layer such as a carbon or $SiO_2$ layer improves the wear resistance of the recording media and also provides some corrosion protection to the magnetic film in a low humidity and low temperature environment. Carbon overcoatings for magnetic disks are described by F. K. King in "Datapoint Thin Film Media", published in *IEEE Transactions on Magnetics* in July, 1981, and Japanese Patent Application No. 58140/77 filed May 18, 1977 by Hinata et al., incorporated herein by reference. It is possible, in principle, to increase the corrosion protection by increasing the thickness of the carbon or $SiO_2$ overcoat. However, the maximum thickness of the overcoat that is tolerable for high performance disk media is about 2 microinches to permit the read-write head to fly close to the media. Of importance, the electrical performance of the disk is improved as the overcoat is made even thinner. The decrease in overcoat thickness decreases the "effective flying height" of the head on the media (i.e. the gap between the surface of the head and the magnetic layer), thereby improving the signal to noise ratio (S/N), resolution, and overwrite characteristics of the recording media. Unfortunately, if the carbon or $SiO_2$ overcoat thickness is less than 2 microinches, the overcoat does not provide sufficient corrosion protection for the magnetic media.

To improve the corrosion protection of the magnetic media provided by carbon, it is known in the art to deposit a thin chromium layer between the magnetic thin film media and the overcoat layer. In this multilayer overcoat structure, the chromium layer provides enhanced corrosion resistance while the carbon overcoat provides good wear resistance. However, in order to have effective corrosion resistance as well as good wear resistance provided by the carbon-chromium multilayer structure, the total overcoat thickness must be greater than 2 microinches, which is not desirable for a high performance disk.

As mentioned earlier, the overcoat must not only protect the magnetic film from corrosion, but it must also protect the magnetic film from wear. A further requirement is that the static and dynamic friction coefficients between the read-write head and the overcoat must remain low over a large number of start/stop cycles. (The static friction coefficient is the ratio of lateral force to the normal loading force on the head as the disk starts to rotate. The dynamic friction coefficient is the ratio of the lateral force to the normal loading force after the disk has started to rotate.) If the static friction coefficient between the head and the overcoat material is too high (greater than 1.0), a small motor used in the drive will have difficulty starting rotation of the disk from a stationary position, and if a large motor drives the disk, the motor may cause the head to break off from the head suspension. In addition, if the static and dynamic friction coefficients are too high, mechanical contact between the read-write head and the disk will cause excessive wear in the overcoat and eventually a head crash.

When the disk is rotating in the drive, the head "flies" at a typical distance of about 5 microinches to 15 microinches above the disk. When the drive is turned off, the head comes into physical contact with disk. Since the drive is likely to be repeatedly turned on and off during its lifetime, the overcoat must protect the magnetic film from wear, and at the same time, the static and dynamic friction coefficients between the head and the overcoat must remain low after repeated start/stop cycles. It has been demonstrated that even though hard carbon and $SiO_2$ overcoats resist wear well, static and dynamic friction coefficients increase dramatically after repeated start/stop cycles.

Because of the above-described mechanical and corrosion problems, it would be desirable to coat a magnetic disk with an overcoat material which would improve corrosion protection of the magnetic film without being excessively thick and at the same time exhibit good wear resistance and consistently low static and dynamic friction coefficients.

SUMMARY

In accordance with our invention, a layer of $ZrO_2$ (zirconium oxide) is formed on a film of magnetic recording media thereby enhancing resistance to corrosion and providing good wear resistance and reduced static and dynamic friction coefficients. The magnetic recording media can be any suitable media, such as a Co-Pt, Co-Ni-Cr, Co-Ni-Pt, Co-Cr, Co-Ni, Co-Cr-Pt, or other cobalt-based alloy deposited by sputtering or plating, or Co-P or Co-Ni-P deposited by a chemical plating process. In addition, the magnetic recording media can also be an iron-based alloy. We have found that a thin $ZrO_2$ layer greatly inhibits corrosion in such films and provides good wear resistance and a low static friction coefficient even after repeated start/stop cycles.

Preferably, the layer of $ZrO_2$ is formed by sputtering. In one embodiment, the sputtering target used to provide the $ZrO_2$ layer comprises a solid solution including $ZrO_2$ and a stabilizer such as $Y_2O_3$, CaO, MgO or any of a number of other stabilizers.

In one embodiment, an intermediate layer of material is provided between the $ZrO_2$ layer and the magnetic media. Of importance, the intermediate layer adheres strongly to both the $ZrO_2$ layer and the media. We have discovered that by providing the intermediate layer, the disk wear resistance is enhanced. In addition, the tendency of the static and dynamic friction coefficients to increase after repeated start/stop cycles is reduced by the presence of the intermediate layer. The reason for this is that without the intermediate layer, the stress applied to the bond between the $ZrO_2$ and media by the friction force of the read-write head against the disk may cause the $ZrO_2$ layer to peel and blister after prolonged repeated start/stop cycles if the bonding between the $ZrO_2$ and magnetic media is not sufficiently strong. The peeling can cause asperities on the media surface which further increase static and dynamic friction between the head and disk, and therefore increase wear. The peeling also causes entrapment of debris (comprised mainly of the overcoat material) between the head and media surface, which further increases static and dynamic friction. This can eventually cause a head crash or a catastrophic failure. By providing the intermediate layer, which exhibits strong adhesion to both the $ZrO_2$ layer and the media, peeling and blistering can be substantially avoided, and the tendency of the static and dynamic friction coefficients to increase as a function of the number of start/stop cycles can be reduced. In an embodiment including a $ZrO_2$ overcoat, the intermediate layer typically comprises chromium, zirconium, hafnium, titanium, tantalum, tungsten or an alloy thereof.

It is noted that an intermediate layer as described above can also be used in conjunction with overcoats other than $ZrO_2$. For example, in one embodiment, an intermediate layer as described above is provided between the disk media and a hard protective layer comprising the boride, nitride, or carbide of hafnium, zirconium, tantalum or titanium. In another embodiment, the hard protective layer comprises the oxide of tantalum, titanium, or hafnium. As described below, the identity of the intermediate layer depends in part on the identity of the material selected for the protective overcoat.

BRIEF DESCRIPTION OF THE DRAWINGS

FIG. 1 illustrates the results of a static and dynamic friction test performed on a disk coated with $ZrO_2$ in which the disk was repeatedly rotationally displaced to a maximum rotation of 300 rpm from a stationary position (i.e. a start/stop cycle test);

FIGS. 2a and 2b illustrate the results of a static and dynamic friction test performed on a pair of conventional carbon coated disks in which the disks were repeatedly rotationally displaced from a stationary position;

FIG. 3 illustrates the variation in the static friction coefficient as a function of the number of start/stop cycles for a number of disks having various overcoats;

FIG. 4 illustrates the increase, as a result of repeated start/stop cycles, in dynamic and static friction coefficients between a read-write head and a disk in which $ZrO_2$ is formed directly on the media; and FIG. 5 illustrates the increase in dynamic and static friction coefficients between a read-write head and a disk coated with a chromium layer which in turn is coated with $ZrO_2$.

DETAILED DESCRIPTION

A hard disk constructed in accordance with one embodiment of our invention is fabricated by plating an NiP layer onto an aluminum substrate. A film of magnetic recording media is then formed on the NiP layer. The film can be Co-Ni-Pt, Co-Ni, Co-Pt, Co-Ni-Cr, Co-Cr, Co-Cr-Pt, or any other appropriate cobalt-based alloy deposited by any appropriate process such as vacuum evaporation, sputtering, electroplating, or electroless plating. In addition, Co-P, Co-Ni-P, iron-based or other alloys can also be used. The recording media is typically about 70 nm thick or less.

A $ZrO_2$ layer is then sputtered onto the recording media, typically to a thickness between 10 and 60 nm. The $ZrO_2$ is typically formed by RF diode or RF magnetron sputtering. During RF sputtering, the gas pressure in the sputtering apparatus is typically 3 to 30 millitorr of argon. The $ZrO_2$ film can also be formed by electron beam evaporation, chemical vapor deposition, or plasma assisted chemical vapor deposition. Advantageously, the $ZrO_2$ layer inhibits corrosion in the magnetic recording media. This is illustrated in Table 1 below compares corrosion in $ZrO_2$ coated films with corrosion in films coated with carbon instead of $ZrO_2$. The data of Table 1 was taken by placing four disks in an environment of 90 to 95% relative humidity and 80° C. for seven days. The first disk in Table I included a Co-Ni-Pt media covered with 250 Å thick carbon, the second disk included a chromium layer covered with Co-Ni media covered with 250 Å thick carbon, the third disk included Co-Ni-Pt media covered with 200 Å thick $ZrO_2$, and the fourth disk included Co-Ni-Pt covered with 200 Å thick chromium covered with 200 Å thick $ZrO_2$. Corrosion was evaluated by visual tests, magnetic tests and glide height tests.

Corrosion on disks can be visibly detected since Co-based films corrode to form cobalt oxide or cobalt hydroxide, and thus appear blue compared to the original gold or brown color.

The magnetic test includes testing for an increase in the number of defect sites on the surface of the disk after exposure to the above-described environment. An increase in the number of defect sites occurs because the magnetic media corrodes and becomes nonmagnetic, hence the recording head is not able to record data at the site of corrosion. A typical uncorroded disk contains less than 10 defects per surface. If the defect count in one of the disks of Table 1 increased by 20 defects from an initial defect count, it was considered to have failed.

A film failed the glide height test if a read-write head suspended 5 microinches above the disk surface struck a mound of residual material from corrosion while the disk rotated. As can be seen, the films covered with $ZrO_2$ showed no sign of corrosion after five days in the above-described environment, while the films which were not covered by $ZrO_2$ became unusable due to corrosion. After seven days, both the $ZrO_2$ films passed the visual, magnetic and glide height tests although one of the films exhibited a slight increase in the number of defect sites on the seventh day (possibly due to some corrosion on areas without the $ZrO_2$ overcoat e.g. because of dust particles resting on the media surface prior to $ZrO_2$ deposition).

As shown in Table 1, $ZrO_2$ and $ZrO_2$-chromium overcoated disks show extremely high corrosion resistance even though the thickness of the $ZrO_2$ overcoat is less than 1 microinch (250 Å) and the thickness of the $ZrO_2$-chromium overcoat is less than 2 microinches (500 Å). These results show that the $ZrO_2$ overcoat alone or $ZrO_2$-chromium overcoat is a superior corrosion barrier for high performance disks compared to a carbon overcoat. (As described in greater detail below, the chromium layer also causes the $ZrO_2$ layer to adhere more strongly to the underlying media and enhances disk reliability.)

Co-Ni-Pt magnetic media by RF sputtering while FIGS. 2a and 2b illustrate corresponding results for two magnetic disks coated with diamond-like carbon instead of the $ZrO_2$ and the stablizer. The disks of FIGS. 2a and 2b have slightly different surface textures on the microscopic level. The data in these figures was taken by repetitively starting to rotate the disks from a stationary position to a maximum rotational velocity of 300 rpm and then stopping the disks and measuring the lateral force exerted on the read-write head caused by static friction between the read-write head and the carbon coated and $ZrO_2$ coated disks. During these tests, each read-write head was pushed against the corresponding disk with a force of 15 grams applied in a direction perpendicular to the disk surface. The read-write head

TABLE 1

| DAY | TEST | 700 Å Thick Co—Ni—Pt Alloy Covered With 250 Å Thick Carbon | 1000 Å Thick Cr Covered with 700 Å Thick Co—Ni Covered with 250 Å Thick Carbon | 700 Å Thick Co—Ni—Pt Covered with 200 Å Thick $ZrO_2$ | 700 Å Thick Co—Ni—Pt Covered with 200 Å Thick Cr Covered With 200 Å Thick $ZrO_2$ |
|---|---|---|---|---|---|
| 1 | Visual | Clear | Tiny spot | Clear | Clear |
|   | Magnetic | No change | No change | No change | No change |
|   | Glide Height | Passed | Passed | Passed | Passed |
| 2 | Visual | Blue spots | Blue spots | Clear | Clear |
|   | Magnetic | Increased/reject | Increased | No change | No change |
|   | Glide height | Failed | Failed | Passed | Passed |
| 3 | Visual | Blue spots | Blue spots | Clear | Clear |
|   | Magnetic | Rejected | Rejected | No change | No change |
|   | Glide height | Failed | Failed | Passed | Passed |
| 5 | Visual | All blue |  | Clear | Clear |
|   | Magnetic | Rejected |  | No change | No change |
|   | Glide height | Failed |  | Passed | Passed |
| 7 | Visual | All blue |  | Clear | Clear |
|   | Magnetic | Rejected |  | Slight increase | No change |
|   | Glide height | Failed |  | Passed | Passed |

When the $ZrO_2$ is sputtered onto the magnetic recording media, in one embodiment, the sputtering target includes a stabilizer such as $Y_2O_3$, $LaO$, $CaO$, $ThO_2$, $CeO_2$, $MgO$, $HfO_2$, $Sc_2O_3$, or other rare earth oxide. In addition, a number of other stabilizers are also appropriate. (The stablizer prevents phase transformation of the $ZrO_2$ to the monoclinic phase, thus making the $ZrO_2$ sputtering target and the resulting film less brittle.) A typical sputtering target used in accordance with our invention is 1 to 20% stabilizer by weight (preferably 4 to 15%) and the remainder $ZrO_2$. (If the stablizer concentration in the film is too high, its strength is degraded. The film composition depends on the sputtering target composition.) However, in another embodiment of our invention, the $ZrO_2$ sputtering target contains no stabilizer. In yet another embodiment, a film including more than 20% stabilizer is used.

In yet other embodiments of our invention, the sputtering target includes $Al_2O_3$ as well as a stablizer to further enhance the hardness of the sputtered protective overcoat. Of importance, both $Al_2O_3$ and the stablizer prevent the sputtering target from fracturing. In one embodiment, the target includes about 12% $Y_2O_3$, 5 to 20% $Al_2O_3$, and the remainder $ZrO_2$. Films having this composition are particularly suitable for disks used with thin film read-write heads made of titanium carbide. In addition, other strength enhancing oxides such as $CeO_2$ or $TiO_2$ can also be included in the sputtering target and hence protective overcoat.

We have discovered that aside from being corrosion resistant, the $ZrO_2$ layer also exhibits superior mechanical qualities. FIG. 1 illustrates the results of a static friction test for a magnetic disk including an overcoat of 88% $ZrO_2$ and 12% $Y_2O_3$ stabilizer formed directly on was positioned at an approximately fixed distance from the center of the disk before the disk started to rotate. As the disk started to rotate, the lateral force exerted on the head by the static friction force was measured by a transducer attached to the suspension of the head. A signal from the transducer was then recorded on the strip chart shown in FIGS. 1, 2a, and 2b. The static friction coefficient is approximately proportional to the distance from the center of the waveforms of FIGS. 1, 2a, and 2b to the envelope 8 surrounding the waveforms. In the strip charts of FIGS. 1, 2a, and 2b, each start/stop cycle caused one upwardly extending spike such as spike 10 and two downwardly extending spikes such as spikes 12. The static friction coefficient $\mu s$ equals the static friction force exerted on the read-write head divided by the normal head loading force, which in this case is 15 grams. As can be seen, the static friction force exerted on the read-write head by the carbon coated film increased over time much more rapidly than the static friction force exerted on the read-write head by the $ZrO_2$ coated film.

Referring to FIG. 1, a static friction coefficient of less than 0.3 was consistently measured when performing about 45 start/stop cycle tests on the $ZrO_2$ coated disk. In contrast, in FIG. 2a, an initial static friction coefficient of about 0.4 was measured during the first pass of the static friction test on the carbon-coated disk, which then rapidly increased to about 0.8 by the eighth pass. In FIG. 2b, an initial static friction coefficient of 0.2 was measured, increasing to about 0.8 by the eleventh pass. (The read-write head in FIGS. 1, 2a and 2b was displaced in both positive and negative directions. This is because of oscillatory motion of the read-write head during the start/stop tests.)

FIG. 3 illustrates the change in static friction coefficient versus the number of start/stop cycles for four disks including a conventional diamond-like carbon coating formed directly on a Co-Ni-Pt film (curves 1 to 4), and for two disks each with a coating including 88% $ZrO_2$ and 12% $Y_2O_3$ formed directly on a Co-Ni-Pt film (curves 5 and 6). (The data illustrated in FIGS. 3 to 5 was taken by performing start/stop tests in the same manner as in the tests described above in relation to FIGS. 1, 2a and 2b.) The surface roughness textures of the disks of curves 1 to 4 were different, thus causing the static friction characteristics of these disks to differ. Specifically, the surface of the NiP layer on the aluminum substrate of the disk of curve 1 (and therefore the surface of the carbon coating of the disk of curve 1) was smoother than the surfaces of the disks of curves 2 to 4 and, therefore, the disk of curve 1 exhibited greater static friction than the disks of curves 2 to 4. In addition, the surface roughness texture of the disks of curves 5 and 6, although differing slightly, had a roughness texture similar to the surface roughness textures of the disks of curves 2 to 4.

As can be seen, the static friction coefficient for a first disk coated with $ZrO_2$ started at 0.32 and increased to 0.39 after 100 cycles (curve 5). A second disk coated with $ZrO_2$ initially exhibited a static friction coefficient of 0.39 which increased to 0.40 after 20 cycles (curve 6). In contrast, the carbon-coated disk corresponding to curve 1 initially exhibited a static friction coefficient of about 0.49 which increased to a value greater than 1.4 after only 5 starts. The other films coated with carbon initially exhibited static friction coefficients of 0.30, 0.35, and 0.40, respectively, which increased to 0.90, 0.60 and 0.80, after 45, 10, and 20 cycles, respectively (curves 2, 3, and 4). Accordingly, it is seen that films coated with $ZrO_2$ exhibited static friction coefficients which remained at lower values over time than carbon-coated Co-Ni-Pt films.

The wear resistance of $ZrO_2$ overcoated disks is superior to carbon overcoated disks. We have discovered that a $ZrO_2$ overcoated disk without additional lubrication can last more than 10,000 fast start/stop cycles while a diamond like carbon overcoated disk without additional lubrication tends to wear out in less than 5,000 fast start/stop cycles. (In a fast start/stop cycle test, the disk is repeatedly rotated from a stationary position to a rotational velocity of about 3600 rpm so that the disk head flies above the media surface. This is in contrast to the start/stop cycles discussed in relation to FIGS. 1, 2a and 2b, in which the disk is rotated to a maximum velocity of 300 rpm and the read-write head never flies. A fast start/stop cycle test, which closely simulates actual use, causes less wear than a 300 rpm start/stop cycle test.) Application of lubrication increases the wear resistance of both $ZrO_2$ and carbon coated disks such that they continue to function properly after more than 50,000 fast start/stop cycles. (Typical lubricants used to enhance the wear resistance of magnetic disks are discussed in the above-incorporated Suganuma paper.) However, after a large number of start/stop cycles (e.g. more than 10,000 fast cycles), the static friction coefficient of a disk coated with $ZrO_2$ and a lubricant generally remains lower than the static friction coefficient of a disk coated with carbon and a lubricant.

As mentioned above, although a disk including magnetic media covered with $ZrO_2$ exhibits superior mechanical qualities, the control of reliability of such a disk can be enhanced by sputtering an intermediate layer of material onto the recording media prior to forming the $ZrO_2$ layer. The intermediate layer typically comprises chromium, zirconium, hafnium, titanium, tantalum, tungsten, or any alloy thereof. Advantageously, these materials alloy easily with magnetic recording media such as Co-Ni-Pt and therefore strongly adhere to the media. In addition, each of these materials forms a strong bond to $ZrO_2$. In one embodiment, the intermediate layer is between 10 and 100 Å, and preferably between 30 and 40 Å. The intermediate material is thin to minimize the total thickness of the layers above the magnetic media, but thick enough to adequately cover the media.

When the intermediate layer comprises chromium, it is typically desirable to use a high voltage biased sputtering target. This ensures that the sputtered chromium particles have a high velocity when they strike the recording media, and thus the resulting chromium layer adheres strongly to the underlying media.

As mentioned above, the intermediate layer enhances control of the reliability of the magnetic disk. Even though a $ZrO_2$ protective film formed directly on magnetic media provides excellent protection against wear, we have discovered that after repeated start/stop cycles (e.g. greater than 100 cycles in a 300 rpm start/stop cycle test), the $ZrO_2$ film formed directly on magnetic media may blister and peel because of stress introduced at the bond between the $ZrO_2$ and the media by the friction force exerted by the read-write head on the $ZrO_2$. This results in entrapment of debris (comprised mainly of the overcoat material) between the head and media surface. This further increases the static and dynamic friction coefficients and the rate of wear finally causes a head crash or a catastrophic failure in the media. By providing the intermediate layer, the peeling and blistering problems are avoided, the above-mentioned increase in static and dynamic friction is reduced, and catastrophic media failure or a head crash is prevented.

FIG. 4 illustrates the gradual increase in static and dynamic friction as a result of repeated 300 rpm start/stop cycles between a read-write head and an 88 % $ZrO_2$ 12% $Y_2O_3$ layer formed by RF magnetron sputtering directly on Co-Ni-Pt recording media. As was the case in FIGS. 1, 2a, and 2b, the distance from the center of the waveform in FIG. 4 to the waveform envelope is proportional to the static friction coefficient. The distance from the waveform center to the lower envelope of dark region 14 of the waveform is proportional to the dynamic friction coefficient. (Dark region 14 represents read/write head displacement caused by dynamic friction.) As can be seen, the static and dynamic friction coefficients are initially 0.2 and 0.12, respectively, but increase to 0.6 and 0.4, respectively, after about 231 start/stop cycles.

FIG. 5 illustrates the static and dynamic friction coefficients as a result of repeated 300 rpm start/stop cycles between a read-write head and an 88% $ZrO_2$ 12% $Y_2O_3$ layer formed under the same sputtering conditions as the $ZrO_2/Y_2O_3$ film of FIG. 4 but with the addition of a chromium layer formed between the $ZrO_2$ and the Co-Ni-Pt recording media. As can be seen, the static and dynamic friction coefficients are initially 0.22 and 0.21, respectively, but increase to only 0.4 and 0.3, respectively, after 1008 start/stop cycles. Thus, it is seen that the intermediate layer further enhances the superior qualities of a $ZrO_2$ protective overcoat on a magnetic disk.

It is noted that the intermediate layer can be used to enhance protective overcoats other than $ZrO_2$ overcoats. For example, when the oxide of hafnium, tantalum, or titanium is used as a hard protective overcoat on a magnetic disk, chromium, zirconium, hafnium, tantalum, titanium, tungsten, or an alloy thereof can be used as the intermediate layer. In such an embodiment, the hard protective layer is about 200 Å thick and the intermediate layer is about 10 to 100 Å thick.

If the carbide, nitride or boride of zirconium, tantalum, titanium, or hafnium is used to form a protective layer, the intermediate layer typically comprises the base metal used to form the protective overcoat. For example, if the overcoat is zirconium carbide, the intermediate layer is typically zirconium or a zirconium alloy. If the protective layer is hafnium nitride, the intermediate layer is hafnium or a hafnium alloy.

In yet another embodiment of the invention, if a plurality of layers are formed on magnetic recording media, an intermediate layer is formed between the media and the bottom layer of the plurality of layers to enhance adhesion between the plurality of layers and the media.

While the invention has been described with respect to a specific embodiment, those skilled in the art will recognize that changes can be made in form and detail without departing from the spirit and scope of the invention. For example, an intermediate layer in accordance with our invention can be formed in a magnetic disk using other multilayer structures. Thus, in a disk including a hard layer of carbon as the protective overcoat, an intermediate layer (typically a noble metal or an alloy of a noble metal such as platinum, rhodium, palladium) can be provided between the carbon and media. In a disk comprising magnetic media covered with chromium (to minimize corrosion) which in turn is covered with carbon (to protect against wear), a noble metal such as platinum, rhodium, or palladium is formed between the chromium and carbon layers to enhance the bonding between the carbon and the rest of the disk.

In addition, instead of using an NiP plated aluminum substrate, other substrates can be used, e.g. glass or ceramic substrates. Also, in some embodiments of our invention, a $ZrO_2$ layer is applied to a floppy disk. A $ZrO_2$ layer in accordance with our invention can also be formed on magnetic tape or a recording drum as well. Accordingly, all such changes come within the invention.

We claim:

1. Structure comprising:
   a film of magnetic recording media on a substrate; and
   a second layer formed above said film, said second layer comprising sputtered $ZrO_2$, a stabilizer and $Al_2O_3$, said structure being constructed for the recording of data in said film of magnetic recording media by magnetic induction recording, said second layer being the uppermost vacuum-deposited layer on said structure.

2. The structure of claim 1 wherein said second layer is the top overcoating of said structure.

3. The structure of claim 1 wherein said second layer has a thickness greater than or equal to 5 nm.

4. Structure of claim 1 wherein said second layer has a thickness between 10 and 60 nm.

5. Structure of claim 1 wherein said recording media is a cobalt based alloy.

6. Structure of claim 1 wherein said recording media is an iron based alloy.

7. Structure of claim 1 wherein said film is part of a hard magnetic disk.

8. The structure of claim 1 wherein said film is part of a floppy disk.

9. The structure of claim 1 wherein said film is part of a magnetic recording tape.

10. The structure of claim 1 wherein said film is part of a magnetic recording drum.

11. Structure of claim 1 wherein the concentration of $Al_2O_3$ in said second layer is less than or equal to about 20%.

12. Structure comprising:
    a film of magnetic recording media on a substrate; and
    a second layer formed above said film, said second layer comprising sputtered $ZrO_2$, $Al_2O_3$ and a stabilizer,
    said structure being constructed for the recording of data in said film of magnetic recording media by magnetic induction recording,
    said structure further comprising a third layer formed between said recording media and said second layer, said third layer enhancing the adhesion of said second layer to the rest of said structure, said third layer being less than about 100 Å thick and wherein said second layer is the uppermost vacuum-deposited layer on said structure.

13. The structure of claim 12 wherein said third layer comprises a material selected from the group consisting of chromium, titanium, tantalum, zirconium, tungsten, and hafnium.

14. The structure of claim 12 wherein said third layer is less than about 40 Å thick.

15. Structure of claim 12 wherein said second layer reduces friction exhibited by said disk and prevents corrosion in said media.

16. Structure of claim 12 wherein said structure is a hard magnetic disk.

17. A method for forming a magnetic data storage device comprising the steps of:
    forming a film of magnetic recording media on a substrate such that data can be recorded in said media by magnetic induction recording; and
    sputtering a second layer on said magnetic recording media, said second layer comprising $ZrO_2$, a stabilizer and $Al_2O_3$, and wherein said second layer is the uppermost vacuum-deposited layer on said device.

18. The method of claim 17 wherein said step of sputtering a second layer comprises a step of sputtering said second layer using a sputtering target, said sputtering target including a stabilizer.

19. The method of claim 17 wherein said second layer has a thickness greater than 5 nm.

20. The method of claim 17 wherein said second layer is between 10 and 60 nm thick.

21. Method of claim 17 wherein said magnetic data storage device is a hard magnetic disk.

22. Method of claim 17 wherein the concentration of $Al_2O_3$ in said second layer is less than or equal to about 20%.

23. A method for forming a magnetic data storage device comprising the steps of:
- forming a film of magnetic recording media on a substrate such that data can be recorded in said media by magnetic induction recording; and
- sputtering a second layer on said magnetic recording media, said second layer comprising $ZrO_2$, $Al_2O_3$ and a stabilizer,
- wherein said method further comprises the step of forming an intermediate layer between said media and said second layer, said intermediate layer enhancing adhesion between said second layer and the rest of said device, said intermediate layer being less than about 100 Å thick, said second layer being the uppermost vacuum-deposited layer on said device.

24. The method of claim 23 wherein said intermediate layer comprises a material selected from the group consisting of zirconium, titanium, tantalum, chromium, tungsten and hafnium.

25. The method of claim 23 wherein said intermediate layer is less than about 40 Å thick.

26. Method of claim 23 wherein said second layer reduces friction exhibited by said disk and prevents corrosion in said media.

27. Method of claim 23 wherein said magnetic data storage device is a hard magnetic disk.

* * * * *

UNITED STATES PATENT AND TRADEMARK OFFICE
CERTIFICATE OF CORRECTION

PATENT NO. : 4,898,774

DATED : February 6, 1990

INVENTOR(S) : Yamashita et al.

It is certified that error appears in the above-identified patent and that said Letters Patent is hereby corrected as shown below:

Col. 4, line 30, insert --which-- after "below".

Col. 4, line 65, insert --covered-- after "$ZrO_2$".

Front page, U.S. PATENT DOCUMENTS, "Nakayima" should read --Nakajima--.

Front page, FOREIGN PATENT DOCUMENTS, "60-0555083" should read 60-055508--.

Signed and Sealed this

Second Day of April, 1991

Attest:

HARRY F. MANBECK, JR.

Attesting Officer

Commissioner of Patents and Trademarks